United States Patent
Chapman

[11] Patent Number: 6,116,909
[45] Date of Patent: Sep. 12, 2000

[54] APPARATUS FOR TEACHING INFANTS HOW TO TIE SHOE LACES

[76] Inventor: Roger Charles Chapman, 13037 - 132 Avenue, Edmonton, Alberta, Canada, T5L 3R2

[21] Appl. No.: 09/359,939

[22] Filed: Jul. 22, 1999

[30] Foreign Application Priority Data

Jul. 22, 1999 [CA] Canada .................................. 2243745

[51] Int. Cl.[7] .................................................. G09B 19/24
[52] U.S. Cl. .......................... 434/260; 434/433; 446/487; 446/488
[58] Field of Search ..................................... 434/247, 260, 434/258, 395, 397; 36/112, 127, 143, 144, 9 A, 9 R; 446/487, 488

[56] References Cited

U.S. PATENT DOCUMENTS 2,777,216  1/1957  Norman .
3,058,241  10/1962  Rigsby .
3,396,480  8/1968  Sherman .
3,762,075  10/1973  Munschy .

Primary Examiner—Robert A. Hafer
Assistant Examiner—Bena B. Miller
Attorney, Agent, or Firm—Christensen O'Connor; Johnson and Kindness PLLC

[57] ABSTRACT

An apparatus for teaching infants how to tie shoe laces is in the form of an enlarged replica of a shoe. The enlarged replica of the shoe has a sole portion, a heel portion, and a upper portion. The upper portion has several pairs of eyelets whereby a shoe lace is laced onto the upper portion. Each of the sole portion, heel portion and upper portion have strategically positioned fasteners that permit the sole portion, heel portion and upper portion to be assembled to form the shoe.

7 Claims, 5 Drawing Sheets

APPARATUS FOR TEACHING INFANTS HOW TO TIE SHOE LACES

FIELD OF THE INVENTION

The present invention relates to an apparatus for teaching infants how to tie shoe laces.

BACKGROUND OF THE INVENTION

An apparatus suitable for teaching infants in daycare and kindergarten classes how to tie shoe laces must meet certain criterion. It is important that everyone in the class can see. The apparatus must, therefore, be visible at a distance for demonstration purposes. Due to space constraints, most kindergartens have only limited room for storage. It is, therefore, important that the apparatus be readily stored.

SUMMARY OF THE INVENTION

What is required is a low cost and easy to store apparatus for teaching infants how to tie shoe laces.

According to the present invention there is provided an apparatus for teaching infants how to tie shoe laces, which includes an enlarged replica of a shoe. The enlarged replica of the shoe has a sole portion, a heel portion, and a upper portion. The upper portion has several pairs of eyelets whereby a shoe lace is laced onto the upper portion. Each of the sole portion, heel portion and upper portion have strategically positioned fasteners that permit the sole portion, heel portion and upper portion to be assembled to form the shoe.

The apparatus, as described above, provides a valuable teaching aid which can be disassembled for storage when not in use.

Although beneficial results may be obtained through the use of the apparatus, as described above, if the sole portion, heel portion and upper portion are separate components; one of the components could become misplaced rendering the apparatus useless. Even more beneficial results may, therefore, be obtained when the sole portion, heel portion and upper portion are conjoined as a single sheet of flexible material.

Although beneficial results may be obtained through the use of the apparatus, as described above, infants learn better when the lesson is incorporated as part of their play. Even more beneficial results may, therefore, be obtained when the enlarged shoe, once assembled, has an interior cavity large enough to accommodate an infant in a seated position.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 2:
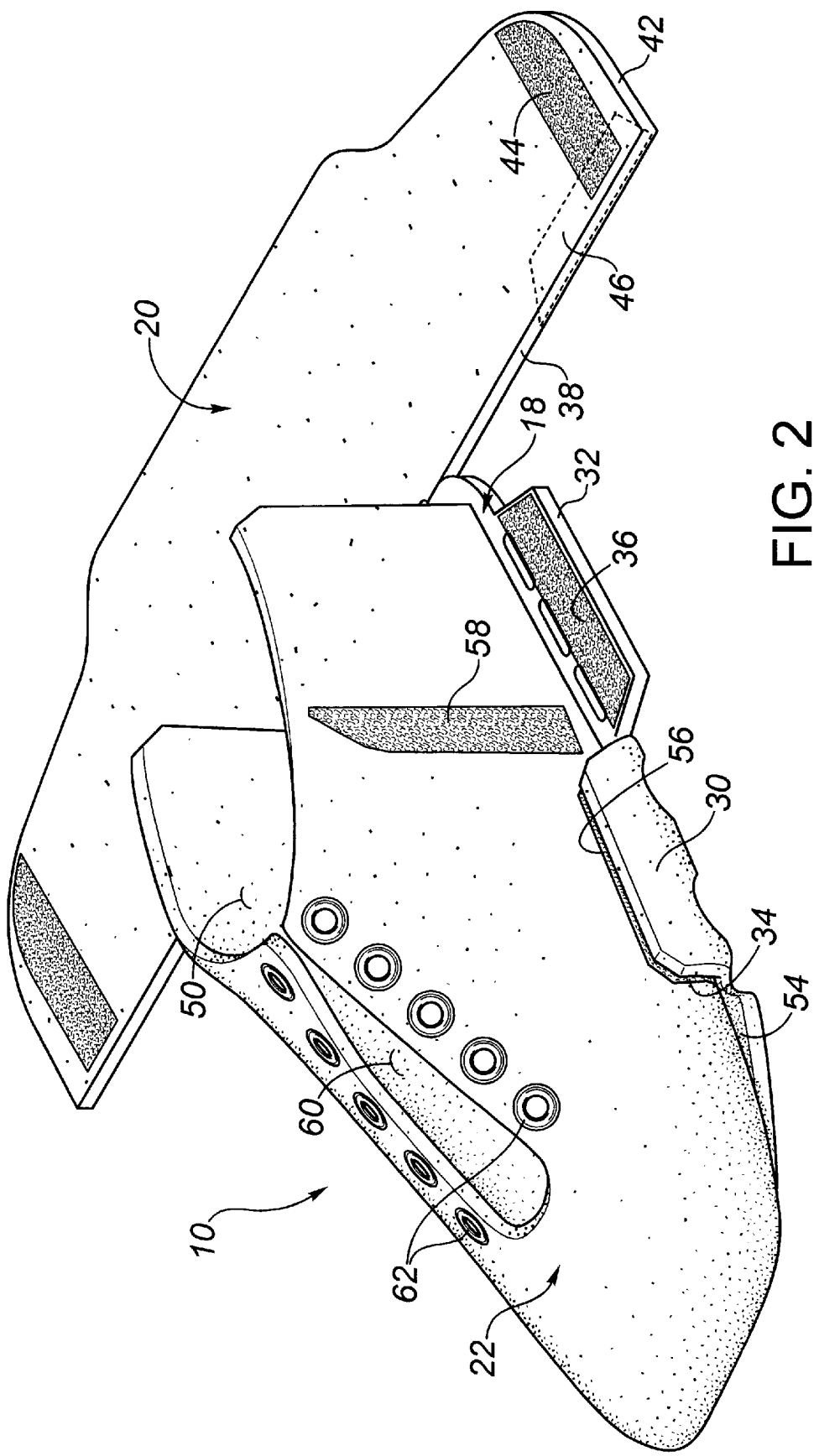
FIG. 2 is a perspective view of the apparatus illustrated in FIG. 1, in a partially assembled condition.
Figure 3:
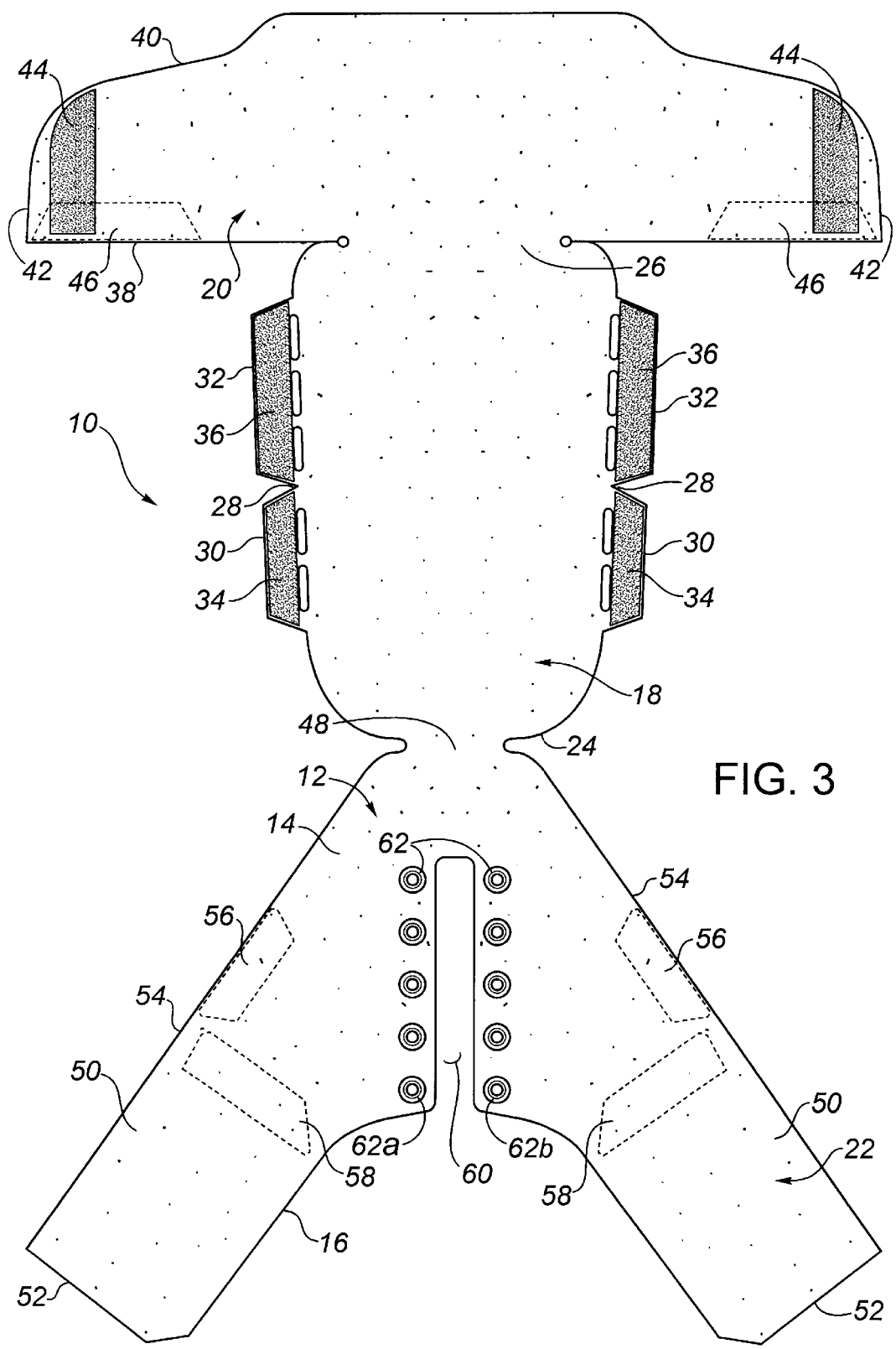
FIG. 3 is a top plan view of the apparatus illustrated in FIG. 1, prior to assembly.

A first embodiment, an apparatus for teaching infants how to tie shoe laces generally identified by reference numeral 10, will now be described with reference to FIGS. 1 through 3.

Figure 1:
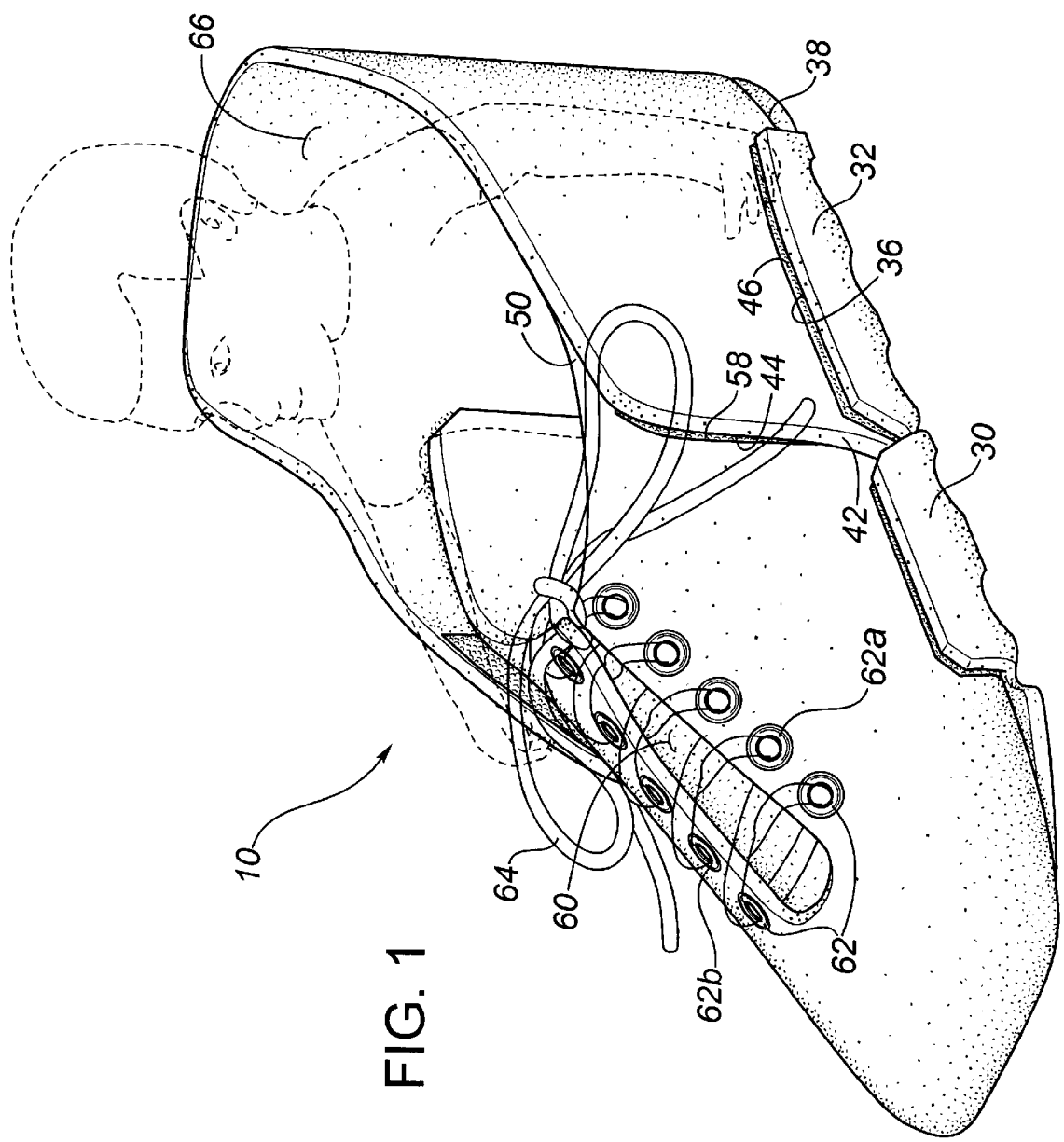
FIG. 1 is a perspective view of a first embodiment of an apparatus for teaching infants how to tie shoe laces constructed in accordance with the teachings of the present invention.

Referring to FIG. 1, apparatus 10, shown in an assembled state, is in the form of an enlarged shoe. Referring to FIG. 3, apparatus 10, shown in a disassembled state ready for storage, consists of a sheet 12 of flexible material having a first face 14 and a second face 16. Beneficial results have been obtained through the use of polymer plastic foam material and other flexible polymer plastic materials. Such materials have been found to be low cost while having adequate durability. The sheet is die cut to provide a pattern for the enlarged shoe, illustrated in FIG. 1. Referring to FIG. 3, sheet 12 has a sole portion 18, a heel portion 20 and an upper portion 22. Sole portion 18 has a first end 24, a second end 26 and opposed sides 28. A first pair of tabs 30 and a second pair of tabs 32 extend from opposed sides 28. First tape fasteners 34 are positioned on each of first pair of tabs 30 on first face 14 of sheet 12. Second tape fasteners 36 are positioned on each of second pair of tabs 32 on first face 14 of sheet 12. Heel portion 20 is conjoined with second end 26 of sole portion 18 to form a "T" shape with sole portion 18. Heel portion 20 having a first edge 38 adjacent to sole portion 18, a second edge 40 remote from sole portion 18 and a pair of third edges 42 connecting first edge 38 and second edge 40. Third tape fasteners 44 are positioned adjacent each of third edges 42 on first face 14 of sheet 12. Fourth tape fasteners 46 are positioned adjacent first edge 38 on second face 16 of sheet 12. Fourth tape fasteners 46 are adapted to mate with second tape fasteners 36 on sole portion 18. Upper portion 22 is generally "V" shaped and has a tip 48, two diverging wings 50, two remote terminus edges 52 on diverging wings 50 remote from tip 48, opposed outer edges 54 that extend from tip 48 along two diverging wings 50 to terminus edges 52. Tip 48 is conjoined to first end 24 of sole portion 18. Upper portion 22 has a fifth pair of tape fasteners 56 positioned along opposed outer edges 54 on second face 16 of sheet 12. Fifth tape fasteners 56 are adapted to mate with first tape fasteners 34 on sole portion 18. A sixth pair of tape fasteners 58 extend transversely across diverging wings 50 at an intermediate position between tip 48 and terminus edges 52 on second face 16 of sheet 12. Sixth tape fasteners 58 are adapted to mate with third tape fasteners 44 on heel portion 20. A slot 60 is positioned in upper portion 22 spaced from tip 48 and intermediate diverging wings 50. Several pairs of eyelets 62 are provided. Referring to FIG. 1, eyelets 62 are intended to permit a shoe lace 64 to be laced onto upper portion 22. Referring to FIG. 3, one eyelet 62a of each pair of eyelets 62 is position on one side of slot 60. Another eyelet 62b of each pair of eyelets 62 is positioned on another side of slot 60. Referring to FIG. 1, Once apparatus 10 is assembled to form an enlarged shoe, it has an interior cavity 66 large enough to accommodate an infant 68 in a seated position.

The use and operation of apparatus 10 will now be described with reference to FIGS. 1 through 3. Referring to FIG. 3, apparatus 10 is stored between uses as a flat sheet 12. Referring to FIG. 2, in order to prepare apparatus 10 for use, upper portion 22 is folded to enclose all but the heel area of sole portion 18. Upper portion 22 is maintained in the position shown in FIG. 2, by folding first tabs 30 on sole portion 18 to a substantially vertical orientation in which first tape fasteners 34 engage fifth tape fasteners 56 positioned along opposed outer edges 54 of upper portion 22. Referring to FIG. 1, heel portion 20 is then folded to a substantially vertical orientation. Heel portion 20 is maintained in the substantially vertical orientation by mating third tape fasteners 44 along third edges 42 of heel portion 20 with sixth pair of tape fasteners 58 which extend transversely across diverging wings 50 of upper portion 22. Heel portion 20 is then further secured to sole portion 18 by folding second tabs 32 to a substantially vertical position in which second tape fasteners 36 on second tabs 32 engage fourth tape fasteners 46 adjacent first edge 38 of heel portion 20. Once upper portion 22 and heel portion 20 are attached, as described, to sole portion 18, apparatus 10 resembles a large shoe. Shoe lace 64 is then laced through eyelets 62 of upper portion 22 to prepare apparatus 10 for use.

It has been found that using a rope for shoe lace 64 helps increase the size of the knot for easy viewing. This also reduces the extent to which the fingers of the person tying the knot impede the infant's view. It has also been found that the infants have an easier time understanding the mechanics of the knot when one end of the rope is coloured red and the other end of the rope is coloured blue. With a little instruction, the infants can learn how to assemble and disassemble apparatus 10.

Figure 4:
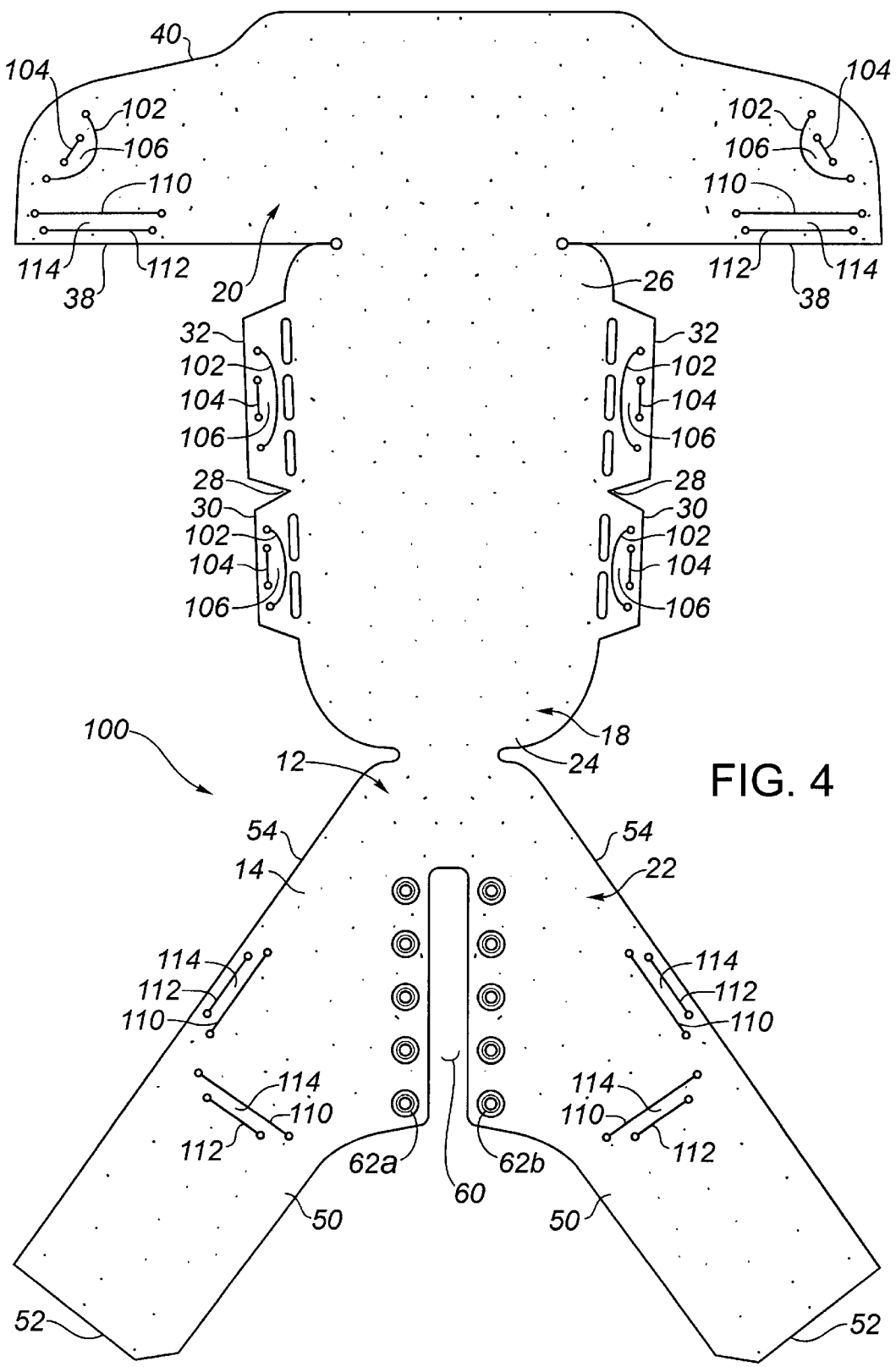
FIG. 4 is a top plan view of a second embodiment of an apparatus for teaching infants how to tie shoe laces constructed in accordance with the teachings of the present invention, prior to assembly.
Figure 5:
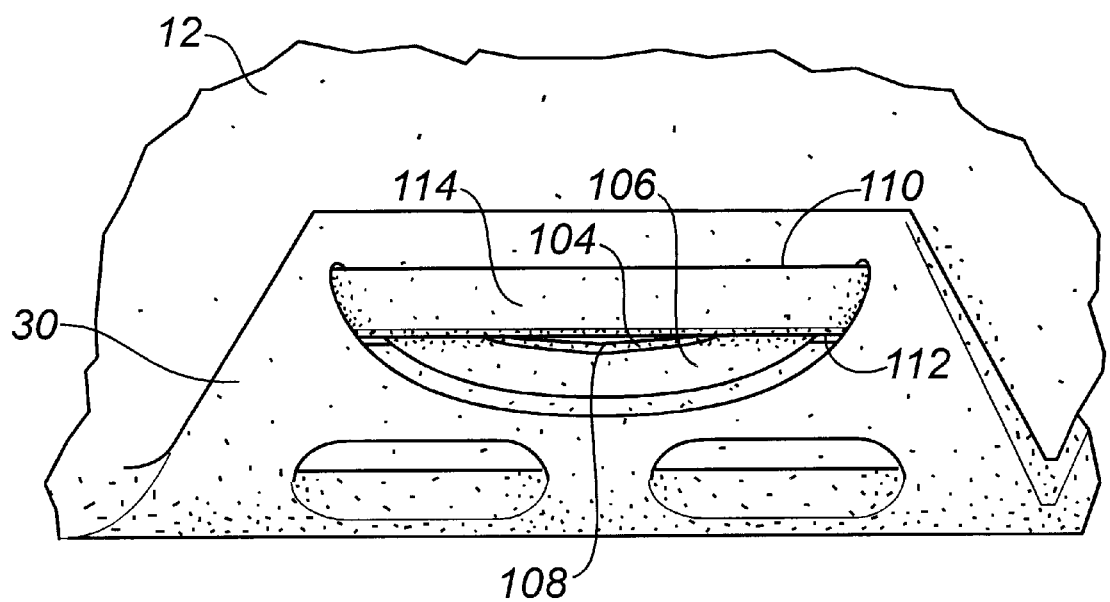
FIG. 5 is a detailed side elevation view of a locking tab portion of the apparatus illustrated in FIG. 4.

A second embodiment, an apparatus for teaching infants how to tie shoe laces generally identified by reference numeral 100, will now be described with reference to FIGS. 4 through 5. While tape fasteners are preferred, they increase the cost of manufacture. As will hereinafter be further described, apparatus 100 uses a slot in combination with a locking tab. Except as otherwise stated, the construction of apparatus 100 is identical to that of apparatus 10. For that reason the same reference numerals have been used. FIG. 4 illustrating apparatus 100 can be contrasted with the like view of apparatus 10 illustrated in FIG. 3. In FIG. 4, it will be noted that apparatus 100 has tabs 30 and 32, as did apparatus 10. However, apparatus 100 does not have tape fasteners 34 and 36. On apparatus 100, each of tabs 30 and 32 have an arcuate cut 102 and a short slit 104. Cut 102 serves to form an intermediate locking tab 106. Referring to FIG. 5, material adjacent slit 104 provides a first engagement edge 108, which serves as a locking mechanism for intermediate locking tab 106, as will hereinafter be further described. Referring to FIG. 4, apparatus 100 also does not have tape fasteners 46, 56 and 58. Instead, apparatus 100 has tab receiving slots 110 into which locking tabs 106 are received and a parallel slit 112 at the positions that tape fasteners 46, 56 and 58 occupied on apparatus 10. Slots 110 and slits 112 have a band 114 positioned between them. Referring to FIG. 5, material adjacent slit 112 provides a second engagement edge 116. Referring to FIG. 5, sheet 12 is bent to assume the positions illustrated in FIGS. 1 and 2. To create an interlock, intermediate tab 106 is inserted through tab receiving slot 110 and slit 112 to assume a position underlying band 114. First engagement edge 108 on locking tab 106 is then engaged with second engagement edge 116 of sheet 12. The flexible material out of which apparatus 100 is made tends to maintain first engagement edge 108 and second engagement edge 116 in locking engagement.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. An apparatus for teaching infants how to tie shoe laces, comprising:

an enlarged replica of a shoe, including
  a sole portion;
  a heel portion;
  an upper portion having several pairs of eyelets whereby a shoe lace is laced onto the upper portion; and
  wherein the sole portion, heel portion and upper portion being conjoined as a single sheet of flexible material, each of the sole portion, heel portion and upper portion having strategically positioned fasteners that permit the sole portion, heel portion and upper portion to be assembled to form the shoe, and the enlarged shoe, once assembled, has an interior cavity large enough to accommodate an infant in a seated position.

2. An apparatus for teaching infants how to tie shoe laces, comprising:

an enlarged replica of a shoe, including:
  a sole portion;
  a heel portion;
  an upper portion having several pairs of eyelets whereby a shoe lace is laced onto the upper portion; and
  wherein each of the sole portion, heel portion and upper portion having strategically positioned fasteners that permit the sole portion, heel portion and upper portion to be assembled to form the shoe, the fasteners being locking tabs which are inserted into tab receiving slots and secured against removal, the locking tabs are secured against removal from the tab receiving slots by a first engagement edge formed by placing a first slit in one of the locking tabs and a second engagement edge formed by placing a second slit parallel to the tab receiving slot in which one of the locking tabs is to be received with a band of material inbetween, one of the tabs is then extended through the tab receiving slot and laid in parallel spaced relation over top of the band with the first engagement edge engaged with the second engagement edge.

3. An apparatus for teaching infants how to tie shoe laces, comprising:

a sheet of flexible material having a first face and a second face, the sheet providing a pattern for an enlarged shoe, including:
  a sole portion having a first end, a second end, opposed sides and a first pair of tabs and a second pair of tabs extending from the opposed sides, first tape fasteners being positioned on each of the first pair of tabs on the first face of the sheet and second tape fasteners being positioned on each of the second pair of tabs on the first face of the sheet;
  a heel portion conjoined with the second end of the sole portion to form a "T" shape with the sole portion, the heel portion having a first edge adjacent to the sole portion, a second edge remote from the sole portion and a pair of third edges connecting the first edge and the second edge, third tape fasteners being positioned adjacent each of the third edges on the first face of the sheet, fourth tape fasteners being positioned adjacent the first edge on the second face of the sheet, the fourth tape fasteners being adapted to mate with the second tape fasteners on the sole portion;
  a generally "V" shaped upper portion having a tip, two diverging wings, two remote terminus edges on the diverging wings remote from the tip and opposed outer edges that extend from the tip along the two diverging wings to the terminus edges, the tip being conjoined to the first end of the sole portion, the upper portion having a fifth pair of tape fasteners positioned along the opposed outer edges on the second face of the sheet, the fifth tape fasteners being adapted to mate with the first tape fasteners on the sole portion and a sixth pair of tape fasteners extending transversely across the diverging wings at an intermediate position between the tip and the terminus edges on the second face of the sheet, the sixth tape fasteners being adapted to mate with the third tape fasteners on the heel portion, a slot is positioned in the upper portion spaced from the tip and intermediate the diverging wings, several pairs of eyelets are provided whereby a shoe lace is laced onto the upper portion, one eyelet of each pair of eyelets being position on one side of the slot and another eyelet of each pair of eyelets being positioned on the other side of the slot; and the enlarged shoe, once assembled, has an interior cavity large enough to accommodate an infant in a seated position.

4. An apparatus for teaching infants how to tie shoe laces, comprising:

a sheet of flexible material having a first face and a second face, the sheet providing a pattern for an enlarged shoe, including:

a sole portion having a first end, a second end, opposed sides and a first pair of tabs and a second pair of tabs extending from the opposed sides, first fasteners being positioned on each of the first pair of tabs on the first face of the sheet and second fasteners being positioned on each of the second pair of tabs on the first face of the sheet;

a heel portion conjoined with the second end of the sole portion to form a "T" shape with the sole portion, the heel portion having a first edge adjacent to the sole portion, a second edge remote from the sole portion and a pair of third edges connecting the first edge and the second edge, third fasteners being positioned adjacent each of the third edges on the first face of the sheet, fourth fasteners being positioned adjacent the first edge on the second face of the sheet;

a generally "V" shaped upper portion having a tip, two diverging wings, two remote terminus edges on the diverging wings remote from the tip and opposed outer edges that extend from the tip along the two diverging wings to the terminus edges, the tip being conjoined to the first end of the sole portion, the upper portion having several pairs of eyelets whereby a shoe lace is laced onto the upper portion, the upper portion having a fifth pair of fasteners positioned along the opposed outer edges on the second face of the sheet and a sixth pair of fasteners extending transversely across the diverging wings at an intermediate position between the tip and the terminus edges on the second face of the sheet.

5. The apparatus as defined in claim 4, wherein the fasteners are mating tape fasteners.

6. The apparatus as defined in claim 4, wherein the fasteners are locking tabs which are inserted into tab receiving slots and secured against removal from the tab receiving slots by a first engagement edge formed by placing a first slit in one of the locking tabs and a second engagement edge formed by placing a second slit parallel to the tab receiving slot in which one of the locking tabs is to be received with a band of material inbetween, one of the tabs is then extended through the tab receiving slot and laid in parallel spaced relation over top of the band with the first engagement edge engaged with the second engagement edge.

7. The apparatus as defined in claim 4, wherein a slot is positioned in the upper portion, one eyelet of each pair of eyelets being position on one side of the slot and another eyelet of each pair of eyelets being positioned on the other side of the slot.

\* \* \* \* \*

UNITED STATES PATENT AND TRADEMARK OFFICE
CERTIFICATE OF CORRECTION

PATENT NO.   : 6,116,909
DATED        : September 12, 2000
INVENTOR(S)  : R.C. Chapman It is certified that error appears in the above-identified patent and that said Letters Patent is hereby corrected as shown below:

Title page,
Item [30] Foreign Application Priority Data "1999" should read -- 1998 --.
Item [56] References Cited:
After "Munschy" insert -- OTHER PUBLICATIONS "Learning Shoe" and "Dressing Cube," Friesens Learning Products Catalogue 1999, Dec. 1999, p.96. --

Signed and Sealed this

Fifth Day of March, 2002

*Attest:*

JAMES E. ROGAN
*Attesting Officer*    *Director of the United States Patent and Trademark Office*